(12) United States Patent
Li et al.

(10) Patent No.: US 6,898,278 B1
(45) Date of Patent: May 24, 2005

(54) SIGNALING SWITCH FOR USE IN INFORMATION PROTOCOL TELEPHONY

(76) Inventors: Li Li, 164 Equestrian Drive, Kanata, Ontario (CA), K2M 2B9; Edward Ndububa, 45 Butlermere Drive, Brampton, Ontario (CA), K2B 1G9; Samuel Chen, 715-220 Woodridge Cresent, Nepean, Ontario (CA), K2B 8E9; Jianping Jiang, 607-220 Woodridge Cresent, Nepean, Ontario (CA), K2B 8E9; Jianli Wang, 8-83 Rockway Crescent, Nepean, Ontario (CA), K2G 0M3; Chunsheng Xie, 909-210 Woodridge Crescent, Nepean, Ontario (CA), K2B 8E9; Tu Do, 53 Thunderbird Crescent, Kanata, Ontario (CA), K2M 2H4; Frank Xu, 409-18 Pemberton Avenue, North York, Ontario (CA), M2M 4K9; Yi Oin, 34 Dylan Way, Nepean, Ontario (CA), K2G 6K6; Zoran Milojevic, 423-1025 Grenon Avenue, Ottawa, Ontario (CA), K2B 8S5; Anna Cheung, 46 Peary Way, Kanata, Ontario (CA), K2L 1Z8; Andre Moskal, 55 Farmfield Crescent, Kanata, Ontario (CA), K2M 2J9

( * ) Notice: Subject to any disclaimer, the term of this patent is extended or adjusted under 35 U.S.C. 154(b) by 0 days.

(21) Appl. No.: 09/567,136

(22) Filed: May 8, 2000

(51) Int. Cl.$^7$ ............................................. H04M 5/00
(52) U.S. Cl. ....................................... 379/325; 379/229
(58) Field of Search ................................ 370/401, 522; 379/229, 325

(56) References Cited

U.S. PATENT DOCUMENTS 5,768,361 A * 6/1998 Cowgill ...................... 379/229

6,404,746 B1 * 6/2002 Cave et al. .................. 370/262

FOREIGN PATENT DOCUMENTS

EP 0 891 067 A2 1/1999
WO WO 99/55099 10/1999

OTHER PUBLICATIONS

Lackshmi–Ratan, Ramnath A.; "The Lucent Technologies Softswitch—Realizing the Promise of Convergence"; Bell Labs Technical Journal; Apr.–Jun. 1999; p. 174–195.

* cited by examiner

Primary Examiner—Ahmad F. Matar
Assistant Examiner—Quynh Nguyen
(74) Attorney, Agent, or Firm—Marks & Clerk

(57) ABSTRACT

A signalling switch for use in information protocol telephony is provided, which can initiate, sustain, and terminate a plurality of discrete voice and data calls simultaneously. A plurality of cards are mounted on a computer bus, where the first card is a single board computer whose function is to act as the operations and maintenance control card for the switch. A non-system card functions as a message transport controller card; and there is at least one further non-system card which functions as a master application controller card. Local bus communication among the non-system cards is provided by a local bus found on the message transport controller card. Telephone routing information protocol software is resident in the switch, and the switch communicates externally via Ethernet interfaces. Thus, the signalling switch may be positioned in an information protocol telephony network environment to initiate, sustain, and terminate connections between a client and the network or the network and a client, under the control of the resident telephone routing information protocol software.

14 Claims, 12 Drawing Sheets

ITAD: Internet Telephony Administrative Domain

SIGNALING SWITCH FOR USE IN INFORMATION PROTOCOL TELEPHONY

FIELD OF THE INVENTION

This invention relates to information protocol telephony, and provides a signalling switch therefor. In particular, the present invention provides a signalling switch which is scalable and expandable and which, in certain embodiments, may be repaired by hot swapping of specific cards.

BACKGROUND OF THE INVENTION

High performance telecom/datacom applications always seek to improve their throughput and reduce the operation and system overhead. Traditionally, a programming model for concurrent and distributed processing advocates the synchronous communication and processing of a pool of a relatively large number of threads, in order to perform the data processing task. The threads collaborate and synchronize amongst themselves so as to accomplish the processing task. However, such an approach has limited scalability. Such multi-threaded synchronous programming models are traditionally favored in situations where the input and output rates are relatively low and the processing and data transactions may be tens or hundreds of milliseconds, up even to time periods measured in seconds.

A scalable approach, which is also termed as an event driven asynchronous programming model, is provided by the present invention. Here, the event-driven programming model allows for a high input/output rate and for small transactions—typically those which are within the tens to hundreds of microseconds. Accordingly, significant performance benefits can be achieved using such an event-driven programming model for signalling switches.

It will be noted that the present invention, however, also permits for a synchronous programming model.

In keeping with the objects of the present invention, there is provided a signalling switch for use in information protocol telephony, and for initiating, sustaining, and terminating a plurality of discrete voice and data calls simultaneously, which comprises:

(a) A physical mounting shelf is provided, having a computer bus and a plurality of slots thereon, including a first host slot and a plurality of non-system slots, all in communication with the computer bus.

(b) A first single board computer card is placed in the host slot to serve at least as an operations and maintenance control card for the signalling switch.

(c) A first non-system card is placed in a first non-system slot so as to serve as a message transport controller card for the signalling switch.

(d) At least one second non-system card is placed in at least one second non-system slot, so as to serve as a master application controller card. It will be noted that where there are a plurality of second non-system cards, placed in a plurality of second non-system slots, only one of those cards will be assigned the function of a master application controller card.

(e) At least two local buses are provided either on the first non-system card or by way of a netbackplane to which various cards may communicate. Moreover, at least one PMC site is also found on the first non-system card connected on the first of the two local buses.

(f) The second of the first two local buses, which may be on the first non-system card or on a netbackplane, provides local bus communication between the first non-system card and the second non-system card or cards.

(g) Telephony routing information protocol software is resident on the first message transport controller card.

(h) Finally, the signalling switch includes at least an Ethernet interface which is resident therein, so as to provide communication between the signalling switch and clients of the signalling switch and routers for an information protocol telephony network. Thus, the signalling switch is positioned in an information protocol telephony network environment so as to initiate a transaction between a client and the network or between the network and a client, to sustain any calls being thus handled, and so as to terminate the transaction between the client and the network or between the network and the client when signal to do so, under the control of the resident telephony routing information protocol software.

Typically, the Ethernet interface for the signalling switch is provided by at least one Ethernet card.

In some embodiments, at least two Ethernet cards can provide at least one Ethernet interface, thereby providing redundancy for the Ethernet interfaces of the signalling switch.

Typically, functional base software is provided in the signalling switch for task management purposes. Those task management purposes include mapping, device drivers, and interrupt handling and service routines for events from the plurality of cards which are mounted on the shelf and which communicate with the computer bus.

Typically, the operations and maintenance control card will include node maintenance software resident therein.

Each application controller card may include application dispatcher software which is resident therein, so as to provide line processing, so as to direct and distribute any message having a particular coding to a specific subsystem on the application controller card adapted to handle that particular coding, to receive the results from any specific subsystem of any processing of a message having a specific particular coding that the specific subsystem has handled, and to forward the results of any specific particular coding to the respective client or to the network, all as required.

Where there is node maintenance software resident on the operations and maintenance control card, the application dispatcher software may be further adapted so as to communicate with the node maintenance software so as to provide current device availability information.

Typically, there is a plurality of protocol software for a plurality of message protocols which is resident on the at least one application controller card.

Tuning means may be provided so as to distribute messaging loads among the computer bus and the two local buses on the first non-system card.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
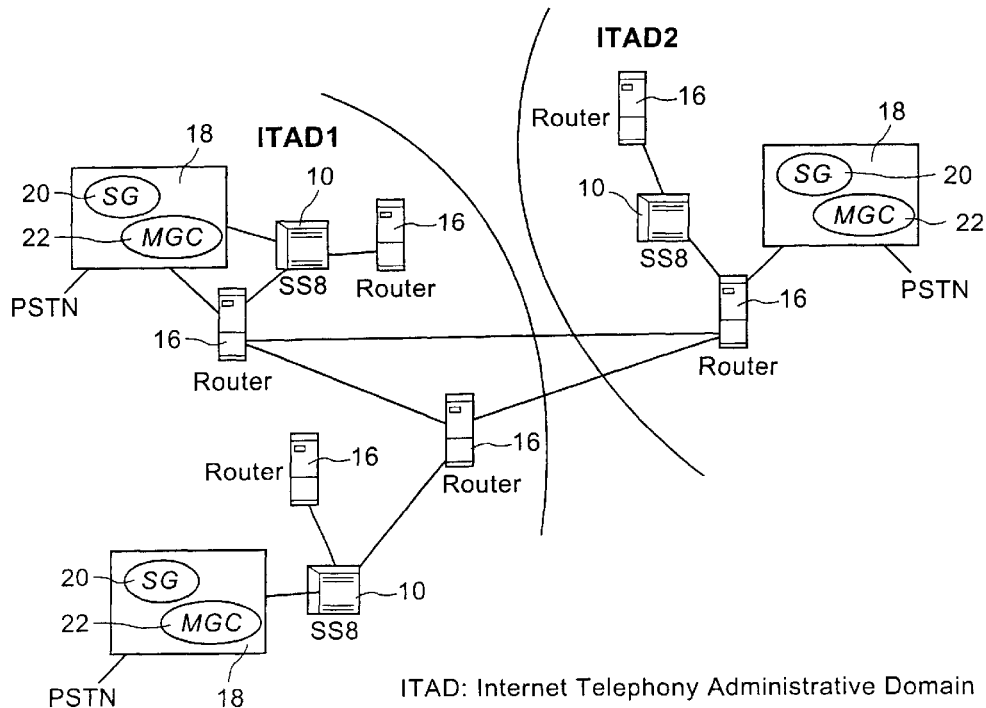
FIG. 1 shows typical use of signalling switches in keeping with the present invention, in an information protocol telephony network environment.

Turning first to FIG. 1, a typical signalling switch network positioning is shown. Here, a plurality of signalling switches 10, in keeping with the present invention, are illustrated being arranged in two typical Internet telephony administrative domains 12 and 14. A plurality of routers 16 is employed, communicating with a plurality of public switched telephone networks 18. Each public switched telephone network 18 is provided with a signalling gateway 20 and a media gateway controller 22.

The functional positioning of each signalling switch 10 is such as to provide call routing, to identify the next hop IP address from the called telephone numbers and thus the next signalling switch 10 to connect to, and to send the call ultimately to the final signalling switch 10 and then the final media gateway controller 22. The signalling switches provide gateway functions between various service providers, including security and service access screening, billing information generation, and so on. They also provide quality of service performance for the signalling transport that is carried on the IP routed network, as well as for the data path for voice traffic which is carried on the IP routed network.

The intention of signalling switches of the present invention is to provide a throughput of 5,000 calls per second, with a sustainable throughput of 1,000 calls per second per signalling switch. However, under overloaded circumstances, a traffic controller may selectively discard incoming messages on ingress queues; selectively giving a higher priority to get through to complete calls that have already taken resources on the switch for processing. In a congested situation, new requests may be discarded; and the session initialization protocol software may send back messages to their respective clients to slow down the incoming call rate.

In any event, active calls will always be protected.

As will be described hereafter, signalling switches in keeping with the present invention will be capable of being configured for protection capabilities ranging from non-protection up to full protection. Moreover, as will be discussed hereafter, signalling switches in keeping with the present invention provide scalability and the ability to be reconfigured while in service. Thus, I/O cards may be added so as to provide additional line protection, and the signalling switch will detect the availability of a new I/O card. Likewise, application processing cards can be added, as described hereafter, so as to increase the processing capacity and capabilities of any signalling switch in keeping with the present invention, without the requirement for maintenance operations to shut down the signalling switch.

Figure 2:
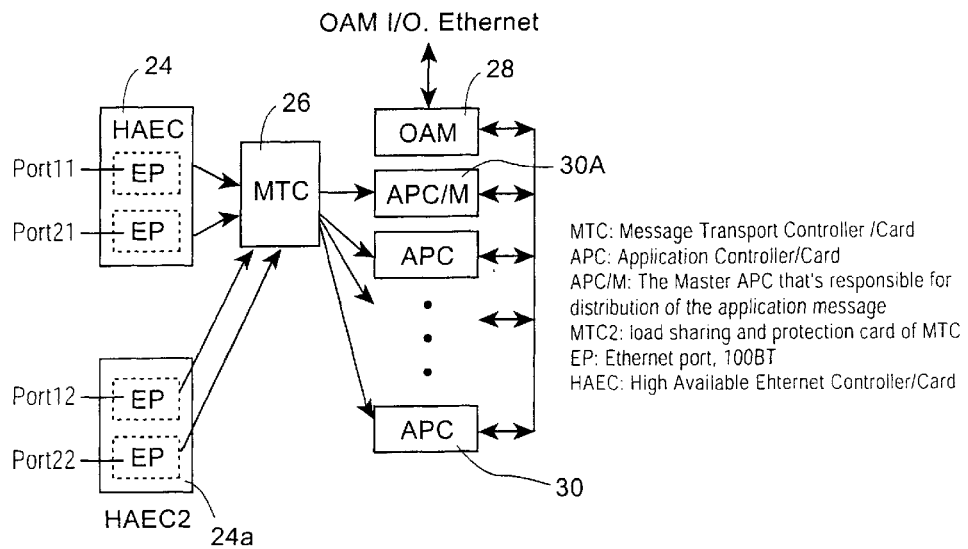
FIG. 2 shows a logical view of the platform for the base system architecture of the signalling switch of the present invention.

Referring to FIG. 2, the base system architecture or physical architecture of a typical signalling switch setup is shown. Here, it is the logical view of the physical architecture which is discussed.

There may be a high available Ethernet card 24, and an alternative or additional high availability Ethernet card 24a. The switch includes a message transport controller card 26, an operating and maintenance card 28, and at least one application controller card 30. In this case, application controller 30a is designated as being that application controller card—in the instance where there is more than one application controller card—which is the master application controller card. That card 30a has responsibility for distribution of application messages to other application controller cards 30 in the signalling switch.

Each high available Ethernet card 24 has port level protection and duplex 100/200 Mbs throughput. Each card 24 may have two to four ports, and possibly up to eight ports. All of those ports can be active so as to provide load sharing of the traffic. If one of the ports fails, then the traffic of the failed port will be balanced immediately to the other working ports, with no interruption to the Ethernet service. All of the ports can share the same IP address and the same media access controller address on a local area network in which the signalling switch is located.

As noted, an optional or additional card 24a may also be provided, whereby that card can be made active so as to further share the traffic load. In that case, if one card fails, then the other card takes over so as to handle the entire traffic load. The failed card can then be serviced and a new card can be plugged in to take the traffic.

The LAN switch to which any signalling switch box in keeping with the present invention is connected, must be compatible, and generally will have the same multi-channel capability as the signalling switch. This is particularly true in respect of any router 16 to which the signalling switches 10 may be connected.

If the ports have the same IP/MAC (Media Access Controller) address, then better protection against port failure is given, without being noticed by any router 16 to which the signalling switch 10 is connected. However, multiple IP addresses can be provided so that the signalling switch 10 can be multi-homed on the network in which it is connected. Thus, if one access router 16 fails, service can still be accessed from an IP address. If multiple IP addresses are used, however, then one server IP address is assigned to a respective signalling switch 10, and that server IP address is different from any of the IP addresses assigned to any of the ports. This way, the signalling switch 10 can be accessed even if some of its ports may have failed.

The message transport controller card 26 has a responsibility for TCP/UDP packet transport. The message transport controller card receives commands from each application which is resident in the signalling switch which wants to utilize the TCP/UDP transport service. For example, such applications may be a session initialization protocol, a telephony routing information protocol, and proprietary software in respect of messages having a particular coding, having a specific translation or other message handling requirements.

The message transport controller card 26 will also handle and manage TCP connections, TCP/UDP ports and sockets, and data packet receiving and transmission functions. When data packets are received, the message transport controller card 26 will deliver those packets to the right message handling application software which is resident in the signalling switch 10, by discriminating on the TCP/UDP port numbers.

Each application controller card 30, or master application controller card 30a, serves the function of application dispatch and distribution. Application messages, for example signalling and routing messages, are processed at the application controller cards 30, 30a. The master application controller card 30a performs several functions. It will parse and identify header fields such as caller ID and conference ID fields on any call and determine that, if it is a call which is already in progress, then those incoming packets will be sent to the application controller card 30 which is already handling that call. If the message is for a new call, then the master application controller card 30a will load balance the other remaining application controller cards 30, and direct the message for the new call to an appropriate application controller card 30. The master application controller card 30a can also handle message processing, unless it has too heavy a message load requirement in parsing incoming messages.

Each application controller card 30 or 30a may have one or a plurality of message coding protocol software included on the card. Thus, depending on the message protocol being used for any incoming or continuing call, as determined by the master application controller card 30a, that incoming message will be handled by the master application controller card 30a, or directed to another application controller card 30 which is known to have the appropriate software resident thereon.

Details concerning the operations and maintenance card 28 are described in greater detail hereafter.

Figure 3:
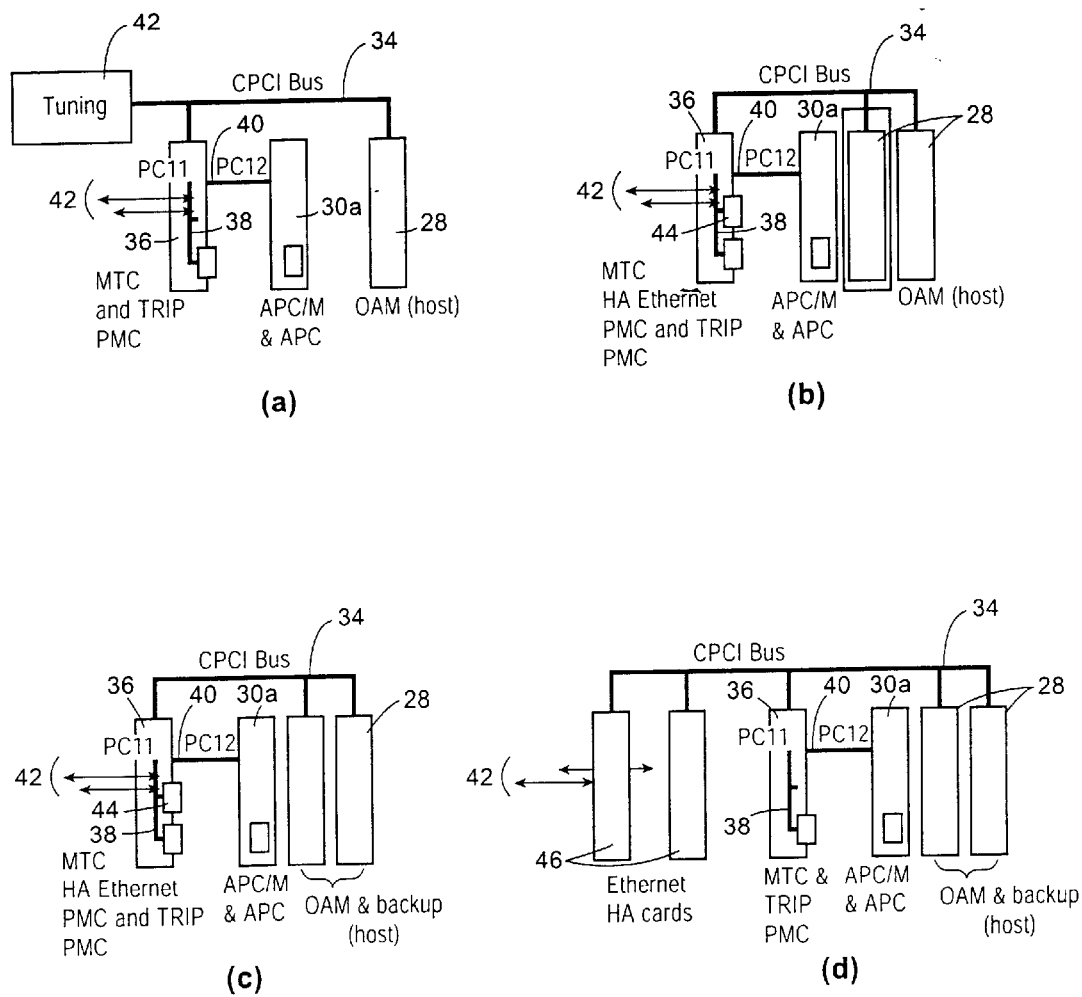
FIGS. 3(a), 3(b), 3(c), and 3(d) show various alternatives of shelf architecture.

Turning now to FIG. 3, several alternative configurations of shelf architecture for the signalling switch of the present invention are shown. Each signalling switch, however, is built on a Compact PCI (CPCI) shelf. The shelf includes a CPCI bus 34. The OAM (Operations And Maintenance) card 28 is placed in the host slot of the CPCI shelf. The non-system slots hold the power PC CPU card for the message transport controller card 26, and the application controller cards 30, 30a. Here, a card 36 is shown which contains the functions for the message transport controller card 26, and also contains telephone routing information protocol software. Moreover, the card 36 has two local PCI buses 38 and 40, which improve communication bandwidth within and between the cards. Two PMC slots are also provided, located on the local bus 38. Connections to the APC (Application Controller Card) 30 or 30a are made over bus 40. Such an architecture isolates the bus 34 from bus 40, for better scaling of loads with increased traffic. Tuning knobs 42 can be provided so as to allocate a different amount of bandwidth to each of buses 34, 38, and 40, and thus so as to accommodate different loads of traffic within the shelf. Typically, the overall bandwidth of buses 34, 38, and 40 is 400 MB/s.

One of the PMC sites on bus 38 is used, if necessary, for security functions, which may be processed on a daughter card elsewhere on the shelf.

If the card 30a is configured as a carrier card, it can carry up to two PMCs, which are utilized for resident protocol software.

FIG. 3a shows a signalling switch shelf architecture which has no protection capability. FIG. 3b shows an alternative embodiment where system protection is provided for the OAM card 30a. FIG. 3c an alternative embodiment—also shown in FIG. 3b—where dual Ethernet ports 42 are connected to a particular PMC slot 44. Finally, FIG. 3d shows an alternative embodiment where the Ethernet cards 46 can be hot-swapped.

Figure 4:
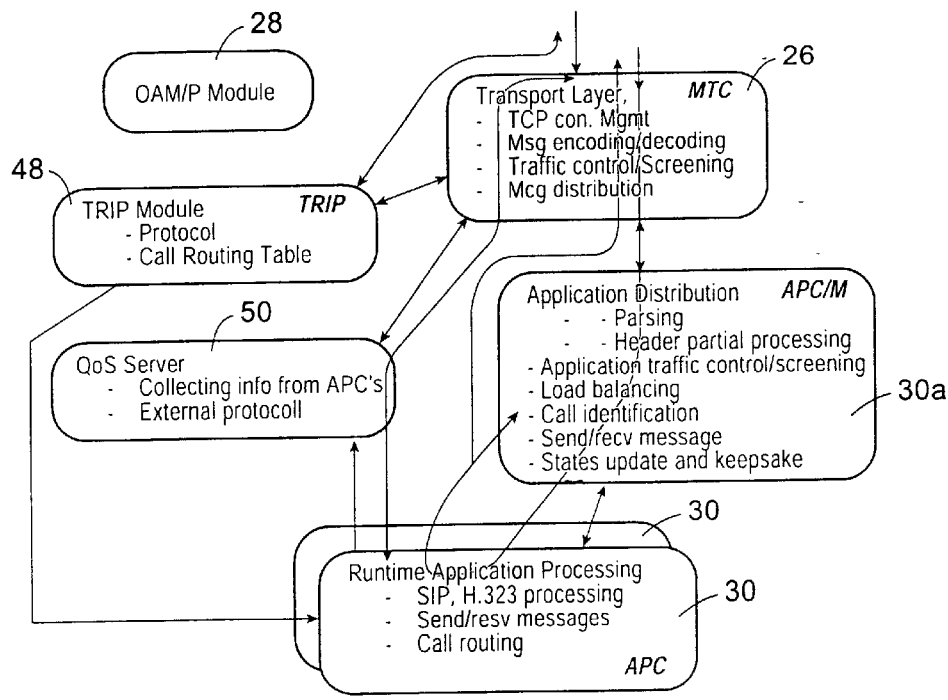
FIG. 4 illustrates the functional partitioning of a signalling switch in keeping with the present invention.

Turning now to FIG. 4, functional partitioning and data flow within any shelf having a signalling switch 10 mounted thereon, in keeping with the present invention, is shown. The cards are functionally partitioned to manage Ethernet ports and transport layer processing, distribution of messages to different application cards, and application processing on the application cards. To optimize the performance and to control the latency, inter-card communication should be minimized. Thus, generally, an application will go to only one card for processing. However, it is possible that different functions can be separated among different cards, so as to provide for expansion.

Briefly, FIG. 4 shows a high level view of the major functional components of the cards in the shelf. The run time data path is described as follows:

First, a message is received at an Ethernet port on the MTC card 26. If it is a TRIP (Telephone Routing Information Protocol) message, the message is sent to the TRIP module 48 resident on the PMC card 36. The TRIP software processes the message, and then downloads an appropriate coding table to the APC cards 30, 30a, through the MTC card 26.

Depending on the particular message coding protocol being used, the message is sent to corresponding application software on the appropriate APC card 30 or 30a. After the application has been processed, an outgoing message is generated, which is also sent to the master APC card 30a so as to update the application distribution table, as well as to the MTC card 26 which connects to the network. A quality of service server 50 may also be employed.

After the APC/M card 30a has received the outgoing message, it will update its state information.

The operations and management card 28 communicates with all of the other cards on the shelf across the CPCI bus 34, as noted previously.

Figure 5:
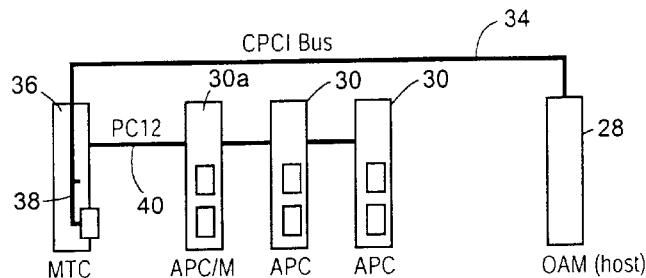
FIG. 5 shows a typical architecture having a single cluster of application controller cards mounted on the shelf.

Referring now to FIG. 5, an architecture is shown whereby a plurality of APC cards 30 are added as a cluster. There is, however, a limitation in that the number of slots on the shelf only permits a limited number of cards. Moreover, the bandwidth of the bus 40 has a finite value.

Figure 6:
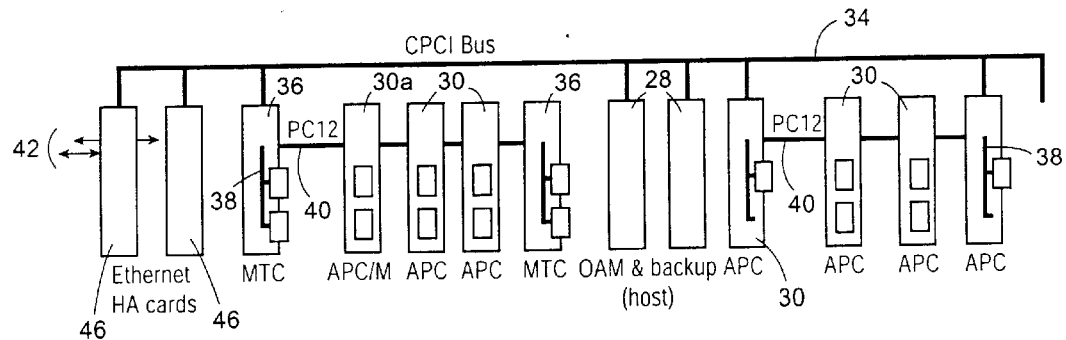
FIG. 6 shows scalability of signalling switches in keeping with the present invention, beyond a single shelf.

A multi-shelf architecture is shown in FIG. 6. Here, scalability of the system is clearly illustrated, by going beyond one shelf having, however, a continuous CPCI bus 34, with multiple clusters of APC cards 30.

Figure 7:
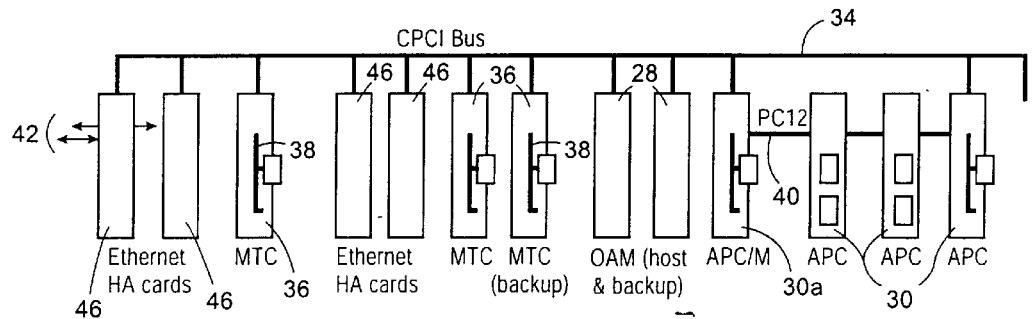
FIG. 7 illustrates a typical further scalability where the signalling switch architecture includes more than one message transport controller card.

FIG. 7 shows another alternative shelf architecture, whereby more Ethernet bandwidth is required and provided so as to sustain the required setup call rate. A plurality of Ethernet high available cards 46 is shown.

Figure 8:
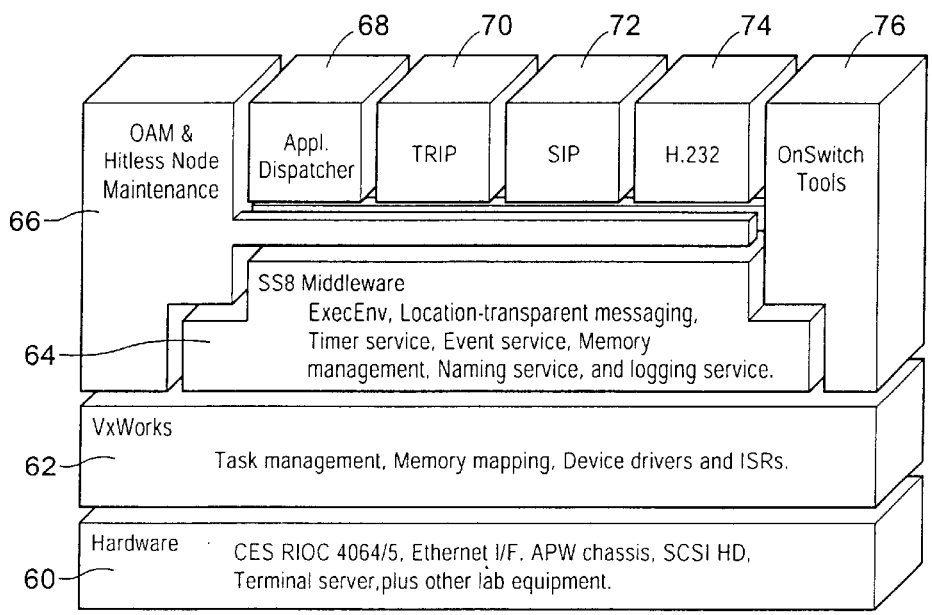
FIG. 8 shows the layered software architecture of signalling switches in keeping with the present invention.

Turning now to FIG. 8, the software architecture of a signalling switch in keeping with the present invention is illustrated. First, the hardware items themselves are shown at 60. Above the hardware 60, are various software items which are described below. The first of those is the base or operating software 62. Its purposes and sub-components include task management including handling the task scheduling and synchronization for the signalling switch; interrupt handling and service routines for events from hardware devices including PCI buses, the CPCI bus, Ethernet ports, the hardware clock, and so on; device drivers which provide higher level processing at the task level, if required; and memory management including memory mapping and protection at the kernel level. For example, mapping local memory to the PCI/CPCI bus address spaces is a function performed by the operating system 62.

Above that, there is a middleware module 64, which provides the virtual machine layer bridging the physical gap between the distributed computer nodes. The middleware provides a single machine programming environment, including location-transparent communications support, timer services, event services, memory management, naming services, and logging services.

There is provided a module 66 which serves to provide high availability node maintenance. Here, hardware support for hot-swap performance is provided, as well as the software architecture for the device driver, as well as operating system and network management level support for high availability Ethernet controller cards, as well the MTC and APC cards. The application dispatcher 68 functions as the gateway between the external Internet domain and the internal distributed processing modules of the signalling switch. As such, it has a number of responsibilities, including: Providing the first line processing, such as logging and registration, of any incoming application protocol packets in terms of TCP/UDP messages; locating the functional subsystem responsible for the message, and further locating the instance of the processing module that should handle the message, according to its protocol, and based on the load balancing and high availability strategies of the functioning signalling switch; distributing the processed messages to the modules via the middleware messaging service 64; receiving the results of the processing from the appropriate and respective functional modules, and forwarding the result to the remote signalling entity; and communicating with the high availability node maintenance module 66 to key in-sync the current device availability information.

Modules 70, 72, and 74 provide resident software for specific messaging protocols, including the telephone routing information protocol, session initialization protocol, H.323 protocol, and (as necessary) proprietary message coding protocols.

Finally, module 76 provides an on-switch tool, giving the capability to access the shelf on which the signalling switch is built either through its main Ethernet link or an Ethernet link in the operations and maintenance module. As well, access authentication is provided for access security, an access agent is provided so as to give functionality to interpret command messages from the off-switch work station and so as to delegate command requests to the destination cards within the shelf, and to provide integration points for de-bugging and tracing functionality within the middleware environment 64.

Figure 9:
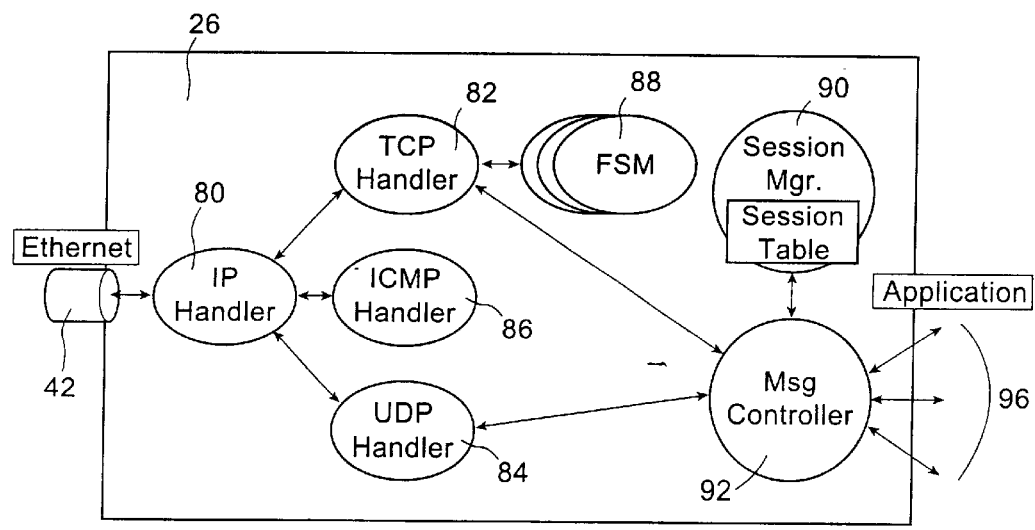
FIG. 9 shows the functional components of a single message transport controller card.

FIG. 9 illustrates an application dispatch of the message transport controller card 26 and the master application controller card 30a. The message transport controller card 26 has seven major components. They include the IP handler 80, whose function is to receive IP packets from and send IP packets to the Ethernet—as shown at 42. IP packet headers are processed, and IP packet error control is exercised. Transport frames are received from and sent to the TCP handler 82, the UDP handler 84, and the ICMP handler 86. Finally, IP packets are generated and sent out to Ethernet.

The TCP handler 82 is responsible for managing TCP connections, and performs the following functions: It creates an FSM instance for each TCP connection; it receives TCP packets from and sends TCP packets to the IP handler 80; it establishes, maintains, and closes TCP connections; it processes TCP packet heads and updates FSM accordingly; and it receives application messages from and sends applications messages to the message controller 92.

The UDP handler 84 receives messages from the IP handler 80 and application messages from the message controller 92. It process UDP packet headers, and it sends UDP data-grams to the IP handler 80 and application messages to the message controller 92.

The FSM module 88 maintains the states and state transition for each TCP connection.

The ICMP handler 86 receives ICMP messages from the IP handler 80, processes ICMP messages, and generates necessary notifications to the operating and maintenance agent 28, and generates and sends ICMP messages to the IP handler, accordingly.

The purpose of the session manager is to create, maintain, and modify a session table, including maintaining information in respect of the session index, the remote IP address of the client or of another signalling switch 10 of the current session being processed, the remote port number of the remote client or other signalling switch 10 of the present session being processed, the protocol of the underlying transport layer, the application protocol running on the current session, the state of the session—only applicable to TCP sessions—and the identifier of the Service access point (Sap) to which the message coming from this session should be directed.

The message controller performs a number of functions, as well, including: Socket session management; receiving and sending messages from the TCP/UDP handlers 82, 84; distributing application messages based on the transport protocol and port number, and receiving messages from applications on the application roster 96. In the event of congestion, it will receive notification from the applications 96 and will use application protocol capability to notify its end users to slow down or to send later. Also, in the case of failure of an APC card 30, the message controller 92 is responsible for distributing application messages to new application cards 30. In cases where there is a backup MTC card 26, such as in FIGS. 6 and 7, the message controller 92 also is responsible for database synchronization with the backup MTC card 36 (26).

With reference to any master APC card 30a, it serves the following functions: It parses incoming messages and caller ID or conference ID. It will check the length of the incoming queue and, if the congestion threshold has been exceeded, it will stop processing new setup call requests. It will ensure and track any in-progress call which has been sent to the appropriate APC card 30, and ensure that that card has that specific call.

It will balance new calls onto all of the APC cards 30 which are available to it—generally, using weighted round-robin protocols. If there are a plurality of APC cards 30, then the card 30a which is the master APC card has smaller weight than any of the other APC cards 30. The APC/M card 30a is also informed when a call is released by any ACP card 30, so that the state held in the APC/M card 30a is cleared. Finally, applications having specific message coding protocols are registered with the message transport controller card 26.

Figure 10:
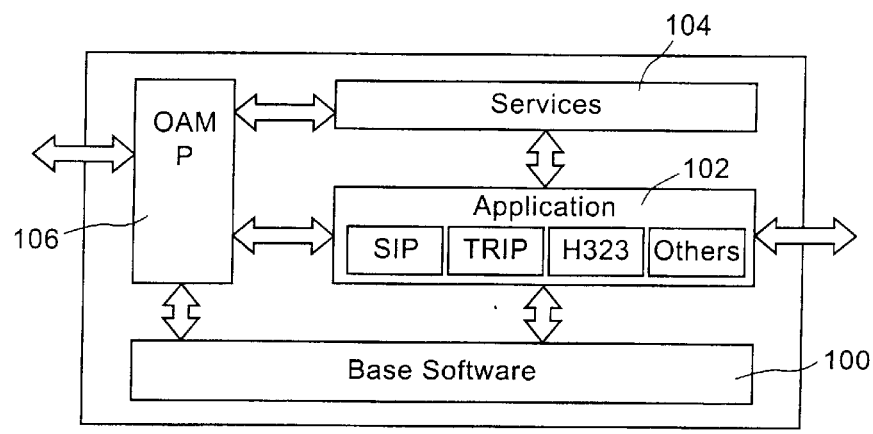
FIG. 10 shows the software interface architecture of a signalling switch in keeping with the present invention.

Referring now to FIG. 10, discussion of the major interfaces in a signalling switch in keeping with the present invention, is made.

Here, for purposes of distinguishing over prior discussion herein, the base software is indicated at 100. The other three basic software systems are the application protocols 102, services 104, and the Operations And Maintenance and Protection (OAMP) module 106.

The base layer 100 provides execution and process environment, inter-application communication capability, timer service, logging service, event service, and then re-management. The OAMP layer 106 provides configuration, fault management, performance management, accounting management, and security management. The application protocol layer 102 provides the capability of various protocol stacks, including such as call routing protocols and call signalling protocols. The services layer 104 provides various services such as gateway location service, call control service, and intelligence services.

Figure 11:
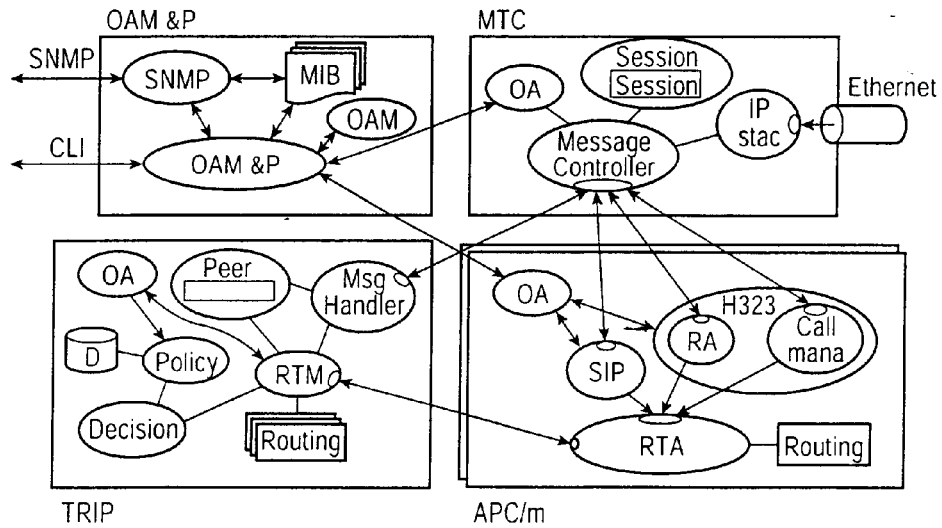
FIG. 11 illustrates the software interfaces between each process carried out by the signalling switch and the naming surface of the base software resident in the signalling switch.

A typical interface among differing cards is shown in FIG. 11. An OAM&P card 28a is shown, together with an MTC card 26, an APC/M card 30a, and a card 108 on which the Telephone Routing Information Protocol (TRIP), is resident. There are five major applications systems included in the signalling switch configuration shown in FIG. 11, including operations and maintenance, message transport controller, and the TRIP proprietary systems. Further reference to FIG. 11 will be made hereafter.

Figure 12:
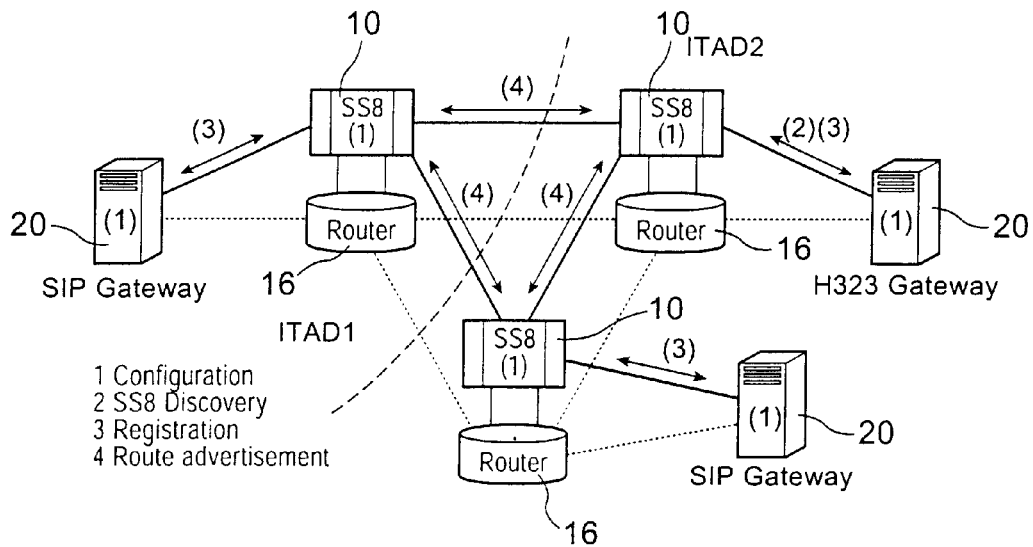
FIG. 12 schematically shows the manner in which a call is registered and its route is advertised.

Turning now to FIG. 12, a network level signalling system is illustrated. Here, the network consists of a plurality of signalling switches 10, routers 16, and session initialization protocol gateways 20. Each gateway 20 has a local database which contains information about alias addresses, such as telephone numbers that it supports, its transport address—that is, its IP address—and the signalling protocols that it supports. Each signalling switch 10 has configuration information concerning identification information, its TRIP (Telephone Routing Information Protocol) peers, the capability which it has set for each protocol, the various policies concerning signal handling that it will follow, etc.

When a client tries to find a particular or potential signalling switch 10, the signalling switch may be assigned manually, or it may be assigned as a consequence of information contained in and exchanged between a respective gateway 20 and signalling switch 10, depending on the message signalling protocol to be used. In any event, a registration request is sent and registered; and TRIP routing information advertisement and routing table is updated. Here, the TRIP protocol retrieves the telephone number to an IP address mapping information database, and advertises the information to other peers according to its own policy. TRIP then builds it routing table based on the registered and advertised address mapping information. In FIG. 12, the switch discovery step is illustrated by double-headed arrow (2); the client registration step is illustrated by double-headed arrow (3); and the TRIP routing information step is indicated by double-headed arrow (4).

Figure 13:
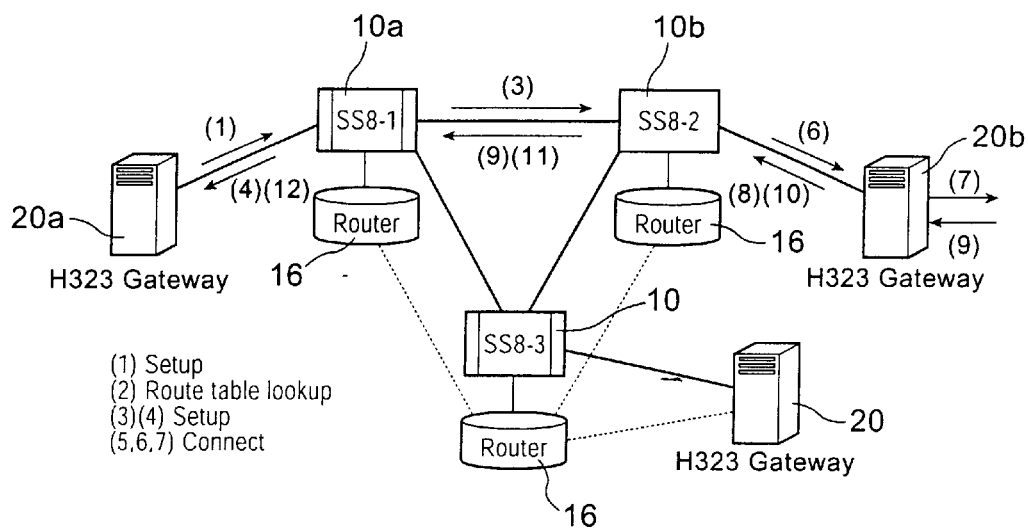
FIG. 13 shows the manner in which the call setup is achieved.

Now, referring to FIG. 13, call setup is illustrated. Here, a number of single-headed arrows indicate various steps during the call setup, as they occur. Arrow (1) shows a call setup arriving from a specific gateway 20a. Event (2) occurs at a specific signalling switch I Oa, by which that signalling switch processes the setup message, and looks at its routing table built by the telephone routing information protocol to find the IP address of either the next hop switch 10 or the destination gateway 20b.

Arrow (3) indicates that the routing table lookup has found a valid IP address for signalling switch 10b, and the call is forwarded to that address. Arrow (4) informs the source gateway 20a that the call is proceeding. The next step (5) is shown at signalling switch 10b, which performs the same step as carried out at signalling switch 10a at step (2). It then forwards the call setup message at arrow (6) to the destination gateway 20b, which translates the message at arrow (7) into whatever signalling message is required at the public switched telephone network side of the destination gateway 20b. The destination gateway 20b also informs the signalling switch 10b that the call is in progress, at arrow (8).

If, by that time, no errors have been detected, then event (9) provides the destination gateway 20a with a connect message from the public switched telephone network which is serviced by the destination gateway 20b. Thereafter, the destination gateway 20b performs whatever signalling message translation is required, and sends a connect message at arrow (10) to the signalling switch 10b. Then, a connect message is sent from signalling switch 10b to signalling switch 10a, at arrow (11); and finally, the connect message is forwarded by the signalling switch 10a to the source gateway 20a, at arrow (12). The connection between the source gateway 20a and the destination gateway 20b is thereby established, through signalling switches 10a and 10b.

Referring again to FIG. 11, specific software and message interfaces are illustrated, the specific details of which are beyond the scope the present invention.

Figure 14:
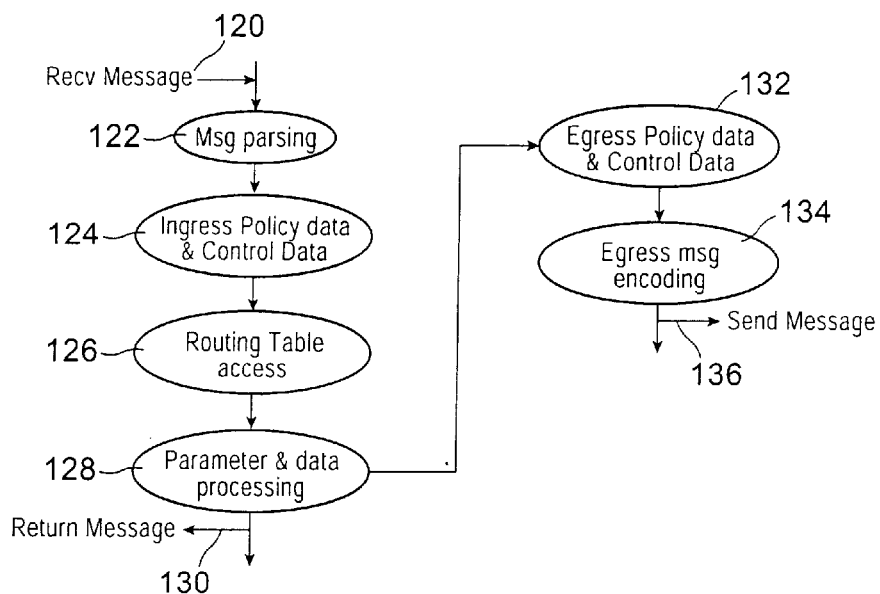
FIG. 14 shows a flow diagram for handling a single call or transaction in the signalling switch.

Turning now to FIG. 14, a generic run-time flow for message processing of single call/transaction is shown.

Here, the message is received at 120, it is parsed at 122, and the ingress policy data and control data for that message is checked at 124. Routing table access is made at 126, and the parameter and data processing concerning that parsed message is made at 128. The message is either returned at 130, as being not acceptable, or it is referred at step 132 for egress policy data and control data management. The egress message is then encoded at 134, and is sent at 136.

Figure 15:
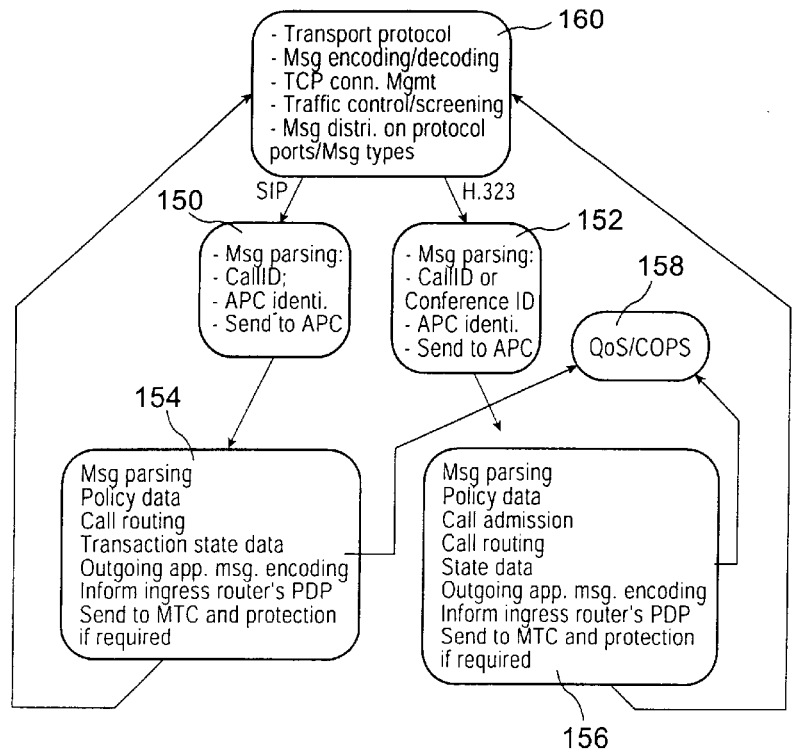
FIG. 15 is a flow diagram showing signal handling across the various cards in a signalling switch of the present invention.

Turning now to FIG. 15, a more detailed description of the procedures and flows involved in the run-time processing is shown, including the relevant different cards on the run-time path.

Two differing protocols are assumed, at 150 and 152. In either case, an incoming message is parsed, including reference to its caller ID or conference ID, and it is sent to the appropriate application controller card 30 or 30a. Then, further parsing and policy data, call routing or call admission and call routing, and transaction state data steps, are taken. The outgoing application message is then appropriately encoded, the ingress router 16 is appropriately informed, and the message is sent to the message transport controller card 26. It may also be sent for message protection if required; and, alternatively, it may also be sent to a quality of service or other protection system module. These steps are shown at 154, 156, and 158. Finally, the transport control, message encoding and decoding, TCP connection management, traffic control and screening, and message distribution on the various or required protocol ports in keeping with the specific message types, are handled at 160.

Figure 16:
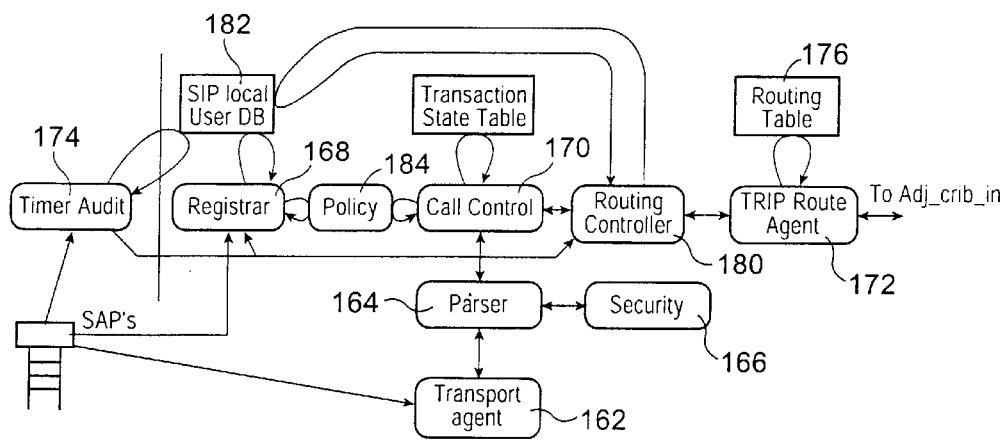
FIG. 16 shows the functional components for a session initialization protocol message.

FIG. 16 illustrates the functional components which are required to implement session initialization protocol services. The transport agent 162 utilizes the transport services provided by the TCP/UDP transport manager in the message transport controller card 26. When receiving a message, the message is from middleware 64 directly. The transport agent identifies which transport protocol/port the message is received on, and provides the information for this transaction. When a session initialization protocol message is to be sent out, the transport interface is responsible to indicate the correct transport/port or connection for this message to the transport manager on the message transport controller card 26, so that the message can be sent on the desired transport/port or connection. The transport agent also requests the transport manager of TCP/UDP on the MTC card 26 to open or close TCP connections on behalf of the session initialization protocol.

The parser 164 encodes and decodes the Sap message.

Security 166 provides a security function at the protocol stack level. It includes the encryption and authorization functions for the message.

The registrar 168 updates the routing agent to tell the telephony routing information protocol about the route to be followed by the message. Call control 170 creates, maintains, or releases, the transaction state information for each transaction being handled, as it is found in the transaction state table 178. It also requests the trip route agent to select a route to reach the called telephone number.

The trip route agent 172 will provide routing and route related services for the phone number address destinations in the messages being handled. It has a "look up" function to provide route selection call control function upon request, it receives routing table updates from the trip server on the trip card 36 or the trip module 48, and manages the local routing table on the application controller card 30 where the message is then resident. Also, the trip route agent 172 accepts updated indications from registrars 168 and a timer audit component 174 to add routes and delete routes from the routing table 176. The purpose of the routing controller 180 is as an interface to the trip routing agent 172. All interactions with the trip route agent 172 go through the routing controller 180.

The local user database 182 is utilized by the registrar 168.

The policy module 184 provides service support. For example, during call processing, as shown in FIG. 14, both ingress and egress policy checks should be performed to implement additional services to the call. Messages may be defined so as to have their own ingress and egress policy trigger points, so that a call may be re-directed, or an incoming call may be blocked.

Figure 17:
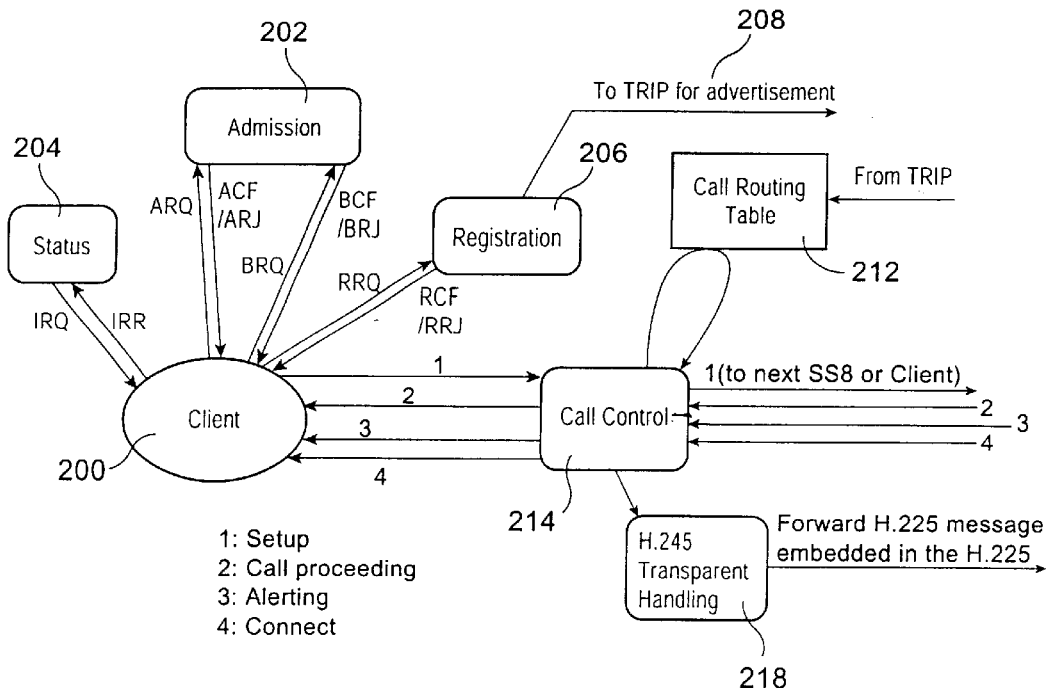
FIG. 17 illustrates signal handling when a call setup is being made.

Referring now to FIG. 17, the call setup messaging is when a call is being setup. Here, the client 200 first sends a request message to the admission module 202, at ARQ. That message is either admitted at ACF or rejected at ARJ. Other interactions between the client 200 and the admissions module 202 may continue, such as to request bandwidth charges at BRQ, BCF, or BRJ; or to the status module 204 for status enquires IRQ and IRR. Registration messages RCF and RRJ are exchanged with the registration module 206, which advertises the request for the call to be telephony routing information protocol software, at 208. Thereafter, a message is sent from TRIP at 210, whereby the call routing table 212 is referred to. The call proceeds through the call control module 214, either to the next signalling switch 10 or to the client being called, at 216. Encoding, if necessary, is carried out at 218.

Figure 18:
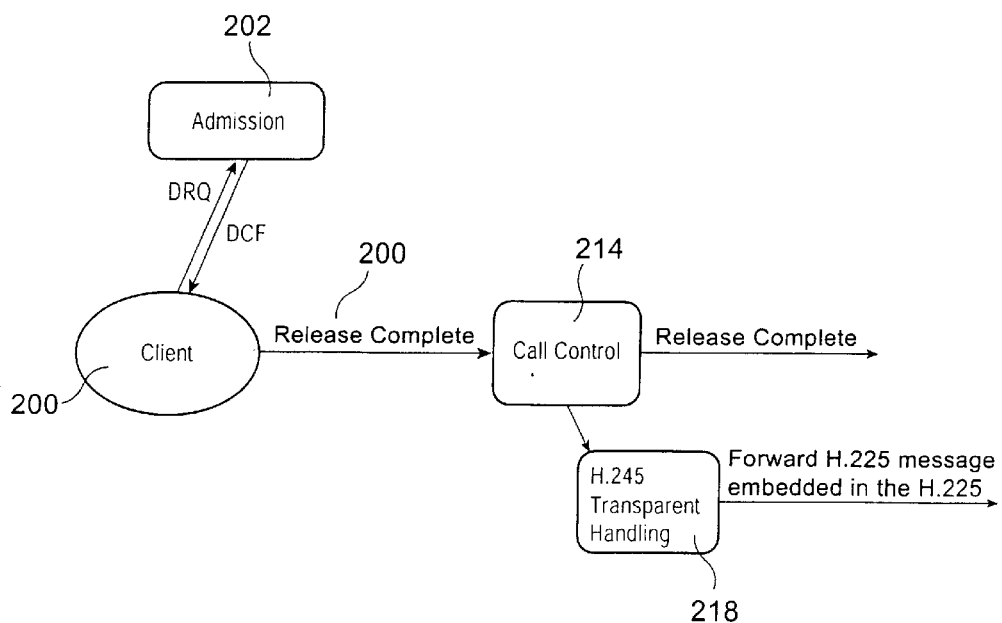
FIG. 18 shows the signal handling when a call release is being made.

To release the message, the admission module 202 exchanges messages DRQ and DCF with the client 200, as shown in FIG. 18. The client 200 then forwards a release complete message 220 to the call control module 214 and to the encoding module 218.

Figure 19:
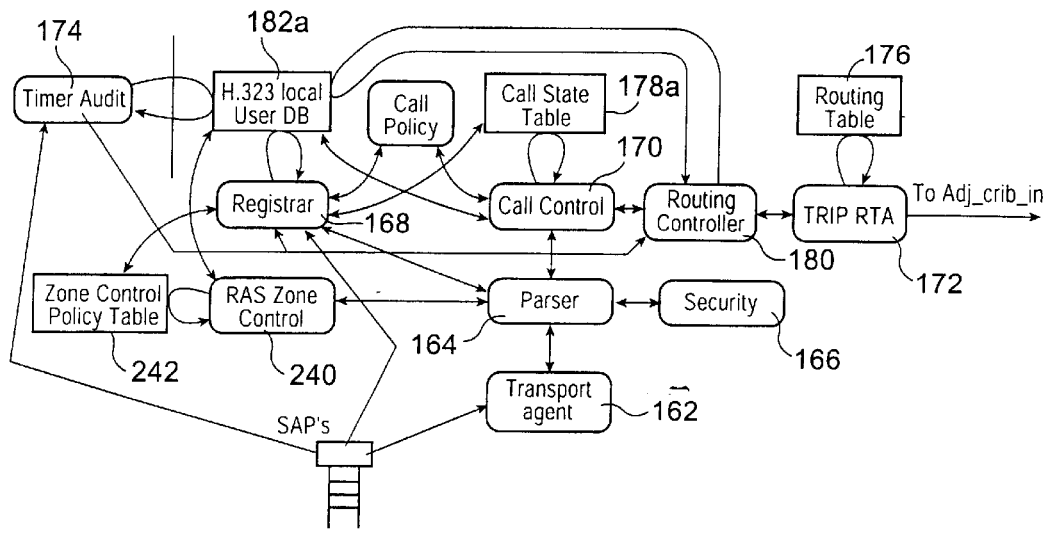
FIG. 19 shows typical signal handling for a typical signal protocol.

FIG. 19 illustrates a specific manner in which messages coded with a particular message coding protocol are handled. It will be seen that the functions are essentially the same as illustrated in FIG. 16 and, for that reason, identical reference numerals or reference numerals with a suffix "a" have been utilized. However, two further modules are shown, being the RAS zone control 240, and its associated zone control policy table 242. The zone control assists the control function in respect of admission, bandwidth, and disengage controls. The zone control information may contain policies with regard to a maximum number of calls, bandwidth that is permitted, and so on. It can also provide status check by generating enquiry messages.

Figure 20:
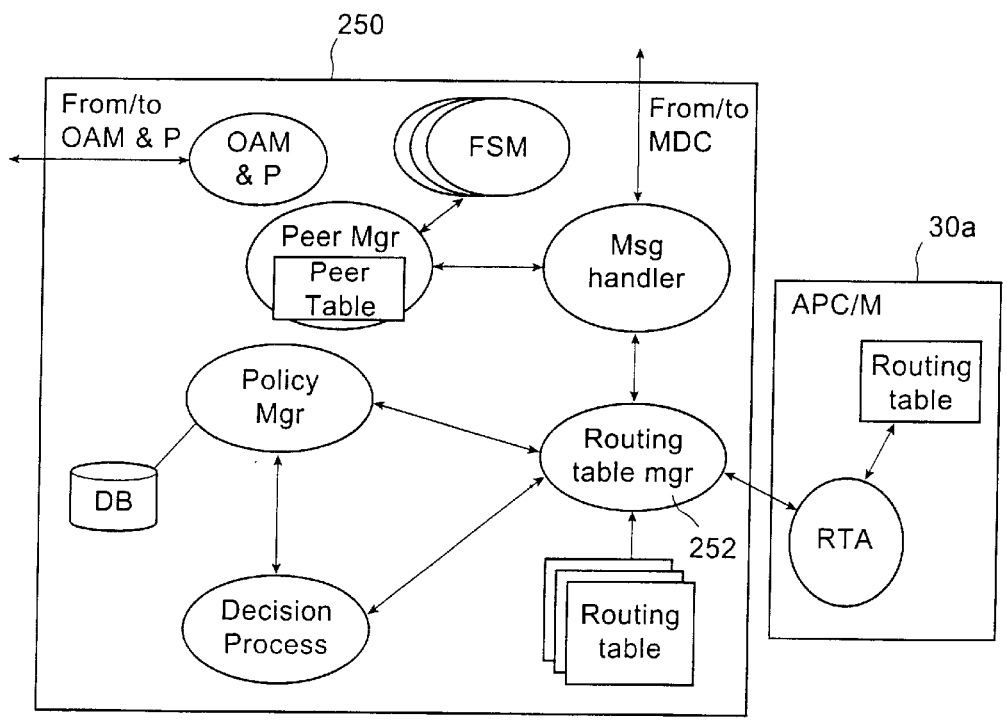
FIG. 20 shows functional components for the telephone routing information protocol of the signalling switch of the present invention.

Looking now to FIG. 20, the functional components of the Telephony Routing Information Protocol (TRIP) are shown. It should be noted that TRIP is designed as an inter-domain IP telephony gateway routing protocol. It supports the functions of establishing and maintaining peering relationships with providers, exchange and synchronization of telephony gateway routing information between providers, prevention of stable routing loops for IP telephone signalling protocols, and propagation of learned gateway routing information to other providers in a timely and scalable fashion. As noted above, the TRIP software is found on the message transport controller card 26, or a daughter card (as illustrated at 36). Further functions include exchange reachability information with its peers, to build routing tables based on the reachability information learned from other signalling switches, and registered by its own clients, and to download routing tables to the application controller cards 30, 30a.

There are two portions which are implemented on two different types of cards. The main TRIP protocol engine runs on the message transport controller card 26, and that is shown at 250. This portion is responsible for database update, route selection and communicating with other portions of TRIP, and so on. The specific details are beyond the scope of the present invention. The other portion of the trip protocol is the routing table agent which is located on the master application controller card 30a. Here, TRIP performs the functions of collecting registration information and feeding back that information to the routing table manager 252, as well as communicating with the routing table manager 252 for route updates, and doing routing table lookup for signalling protocols.

Figure 21:
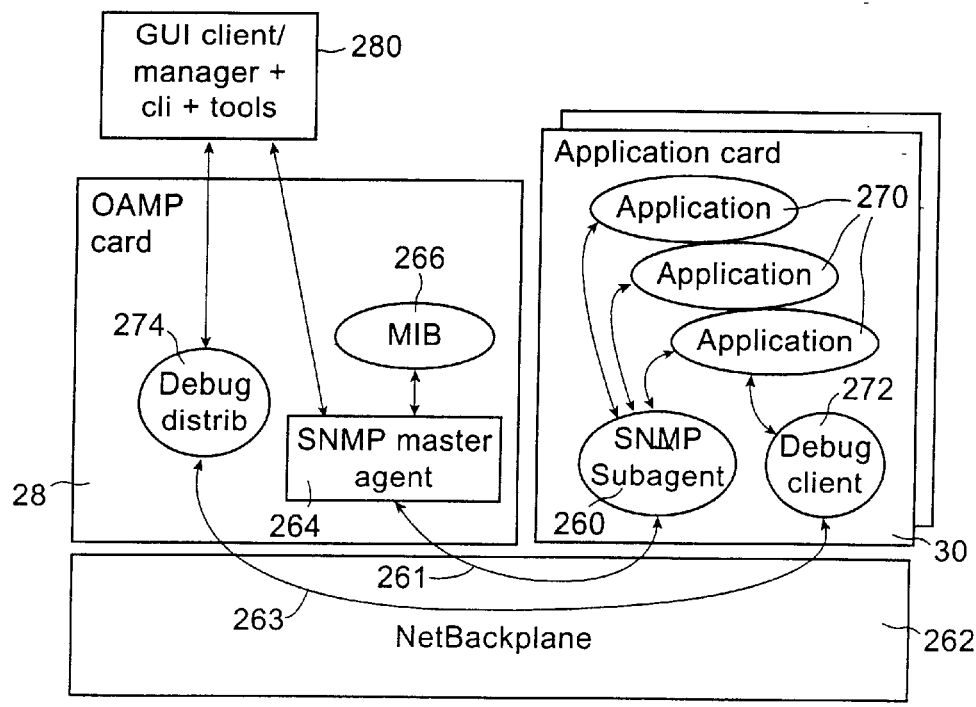
FIG. 21 illustrates the typical major functional components of a typical operating and maintenance and protection operation in keeping with the present invention.

The principal components and functions of the operating and management protection modules, including module 28, are shown in FIG. 21. Here, an SNMP the client or subagent 260 interacts with different internal and external applications, which reside on different nodes, and forwards different SNMP information to the SNMP master agent 264. The SNMP client is found on an application card 30; the SNMP master servant is found on an OAM card 28. The SNMP master agent 264 runs on an SNMP dedicated node, and interacts with the SNMP subagent 260 through inter-card messaging at one end, and with the SNMP master agent 264 and MIB 266 at the other end. The communication between the OAM card 28 and the application cards, as shown by arrows 261 and 263, may be through the netbackplane 262, as noted above. The SNMP server is responsible for waking up SNMP subagents for information elections, and mapping the information collected to the appropriate MIB objects and attributes, and updating the MIB. The SNMP master agent 264 also works with the SNMP subagent 260 to act as a proxy between the applications 270 and the SNMP master agent 264, to map internal events to SNMP traps and forward them to the SNMP manager (not shown).

The OAMP infrastructure includes base OAMP classes for storage and accumulation, messaging between clients and server, definition of application ID's, counter-classes, and event types for different applications 270. Debug client module 272 resides on every application card 30. Its purpose is to receive commands from the debug distributor 274 on the OAMP card 28, execute them, and send the results back to the debug distributor 274. The purpose of the debug distributor 274, which resides on the OAMP card 28, is to receive commands from the user interface running on the management station 280 and to forward them to the debug client 272 according to the address specified in the command header.

The SNMP master agent 264 and MIB 266 also reside on the OAMP card 28. MIB contains the image of the shelf, including relevant information about the states and operational measurements. SNMP master agent 264 acts as a proxy for the SNMP manager, to access the information from the MIB.

The SNMP manager (not shown) will reside on a management workstation such as that shown at 280, and will send management requests to the SNMP master agent and maintain a local copy of the MIB on the management station 280. At the back end, it will interface to a GUI/client manager, plus CLI and appropriate tools, necessary for user interaction.

Figure 22:
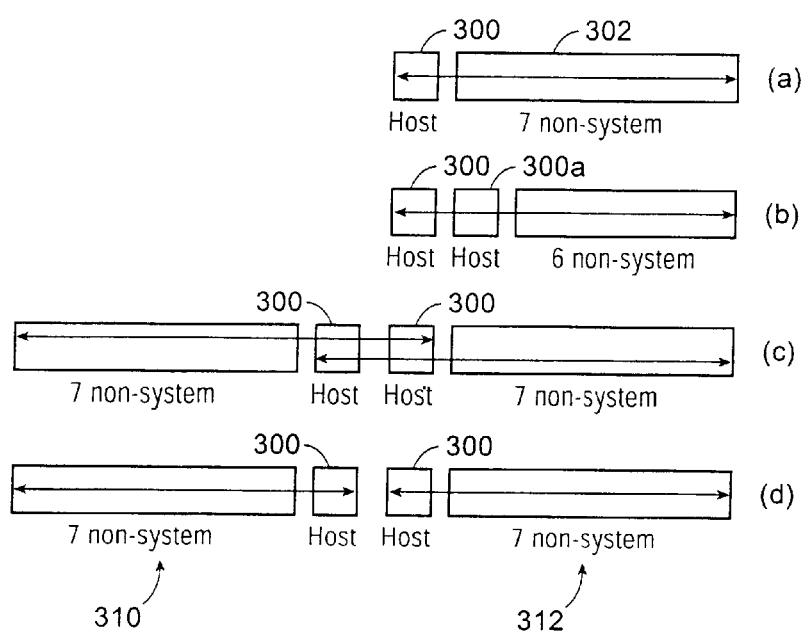
FIG. 22 schematically illustrates various options for protection strategy of typical system architectures of signalling switches in keeping with the present invention.

Referring now to FIG. 22, several options for protection of a signalling switch mounted on a CPCI shelf are shown. FIG. 22a shows a system which does not have protection capability for the host slot 300 or the seven non-system slots 302 on the particular CPCI bus being referred to. If the card in the host slot 300 fails, the CPCI bus 34 is lost, and the entire system fails. However, the cards in the non-system slots 302 can be protected by using redundant cards.

In FIG. 22b, host protection is provided for a single shelf, where an additional host slot 308a is configured appropriately by the shelf manufacturer. This may result, however, in there being fewer non-system slots, due to the physical constraints imposed by the overall design of the shelf FIG. 22c shows host protection for a double shelf, each of which has its own host slot 300.

FIG. 22d shows an option whereby if any card on shelf 310 fails, the entire shelf will be abandoned and switched to another shelf 312. This provides protection against backplane failure, where one shelf can be completely out of order due to a single failure on the backplane.

Figure 23:
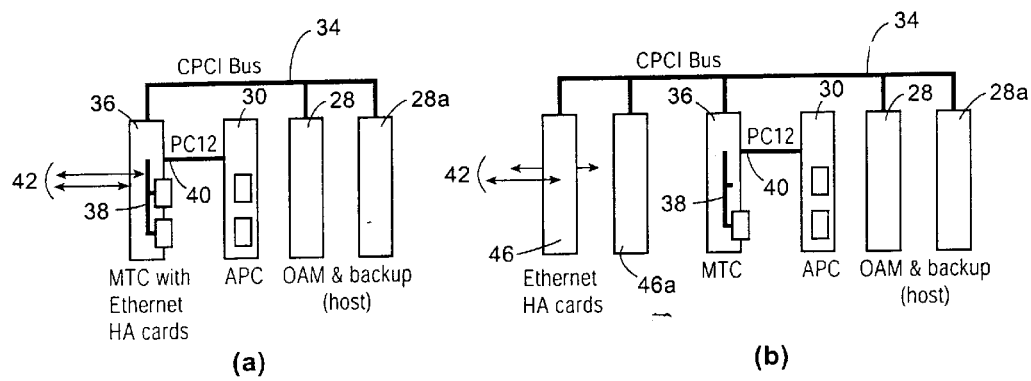
FIG. 23 shows the protection capability of a typical system architecture of signalling switch in keeping with the present invention.

FIGS. 23a and 23b show various possibilities for protection, including the provision of a backup OAM card 28a, and also the provision of additional Ethernet cards 46 and 46a.

Figure 24:
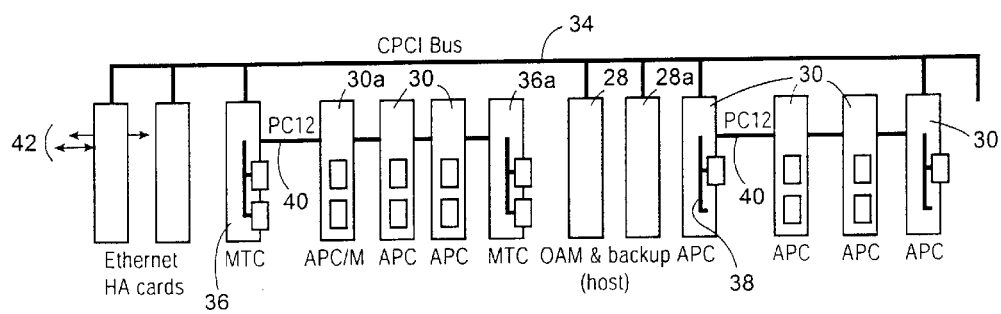
FIG. 24 shows an advanced protection capability for a signalling switch in keeping with the present invention.

Finally, FIG. 24 provides for a backup MTC card 36a, and also provides for two sub-buses 40. Thus, there are two clusters of APC cards 30, so that if one of them fails, the routing between bus 34 and local bus 40 for the cluster can still be provided so that all of the carrier cards of the APC cards 30 can be reached.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A signalling switch for use in information protocol telephony, and for initiating, sustaining, and terminating a plurality of discrete voice and data calls simultaneously, comprising:

a physical mounting shelf having a computer bus and a plurality of slots thereon, including a first host slot and a plurality of non-system slots, all in communication with said computer bus;

a first single board computer card placed in said host slot to serve at least as an operations and maintenance control card for said signalling switch;

a first non-system card placed in a first non-system slot to serve as a message transport controller card for said signalling switch;

at least one second non-system card placed in at least one second non-system slot to serve as a master application controller card;

at least two local buses, at least one of which is on said first non-system card, and at least one PMC site on said first non-system card connected on the first of said two local buses;

the second of said two local buses being selectively located on one of said first non-system card and a netbackplane to which said non-system cards are connected;

said second local bus providing local bus communication between said first non-system card and said at least one second non-system card;

a telephony routing information protocol software being resident on said first message transport controller card; and an Ethernet interface resident in said signalling switch to provide communication between said signalling switch and clients and routers, whereby said signalling switch is positioned in an information protocol telephone network environment to initiate a transaction between a client and the network or between the network and a client, to sustain any call being thus handled, and to terminate the transaction between the client card and the network or between the network and the client when signalled to do so, under the control of said resident telephony routing information protocol software.

2. The signalling switch of claim 1, wherein there are a plurality of second non-system cards placed in a plurality of second non-system slots, and wherein only one of said plurality of second non-system cards has the function of a master application controller card, and the remaining second non-system cards each have the function of an application controller card under the control of said master application controller card.

3. The signalling switch of claim 1, further comprising at least one Ethernet card to provide said Ethernet interface.

4. The signalling switch of claim 1, further comprising a plurality of Ethernet cards to provide a plurality of Ethernet interfaces.

5. The signalling switch of claim 1, further comprising at least two Ethernet cards providing at least one Ethernet interface, whereby redundancy for Ethernet interfaces is provided.

6. A signalling switch for use in information protocol telephony, and for initiating, sustaining, and terminating a plurality of discrete voice and data calls simultaneously, comprising:

a physical mounting shelf having a computer bus and a plurality of slots thereon, including a first host slot and a plurality of non-system slots, all in communication with said computer bus;

a first single board computer card placed in said host slot to serve at least as an operations and maintenance control card for said signalling switch;

a first non-system card placed in a first non-system slot to serve as a message transport controller card for said signalling switch;

at least one second non-system card placed in at least one second non-system slot to serve as a master application controller card;

at least two local buses;

at least a first local bus being on said first non-system card;

the second of said two local buses providing local bus communication between said first non-system card and said at least one second non-system card;

a telephony routing information protocol software being resident on said first message transport controller card; and an Ethernet interface resident in said signalling switch to provide communication between said signalling switch and clients and routers so as to initiate, sustain, and terminate transactions between clients and the network under the control of said resident telephone routing information protocol software;

wherein functional base software is resident in said signalling switch so as to provide task management, memory mapping, device drivers, and interrupt handling and service routines for events from the plurality of cards mounted on said shelf and communicating with said computer bus.

7. The signalling switch of claim 6, wherein said operations and maintenance control card includes node maintenance software resident therein.

8. A signalling switch for use in information protocol telephony, and for initiating, sustaining, and terminating a plurality of discrete voice and data calls simultaneously, comprising:

a physical mounting shelf having a computer bus and a plurality of slots thereon, including a first host slot and a plurality of non-system slots, all in communication with said computer bus;

a first single board computer card placed in said host slot to serve at least as an operations and maintenance control card for said signalling switch;

a first non-system card placed in a first non-system slot to serve as a message transport controller card for said signalling switch;

at least one second non-system card placed in at least one second non-system slot to serve as a master application controller card;

at least two local buses at least one of which is on said first non-system card, and at least one PMC site on said first non-system card connected on the first of said two local buses;

the second of said two local buses providing local bus communication between said first non-system card and said at least one second non-system card;

a telephony routing information protocol software being resident on said first message transport controller card; and an Ethernet interface resident in said signalling switch to provide communication between said signalling switch and clients and routers so as to initiate, sustain, and terminate transactions between clients and the network under the control of said resident telephone routing information protocol software;

wherein each application controller card includes application dispatcher software resident therein so as to provide line processing, so as to direct and distribute any message having a particular coding to a specific subsystem on said application controller card adapted to handle that particular coding, to receive the result from any specific subsystem of any processing of a message having a specific particular coding that said specific subsystem has handled, and to forward the result of any specific particular coding to the respective client or to the network, as required.

9. The signalling switch of claim 8, wherein the particular coding of any message may be in any acceptable protocol recognized by said telephony routing information protocol software, whereby any message may be directed to its destination by said telephony routing information protocol irrespective of its signalling protocol, through a routing table agent.

10. The signalling switch of claim 8, wherein a routing table agent is controlled by said telephony routing information protocol software so as to provide routing and route related services to any message having coding in any acceptable protocol recognized by said telephony routing information protocol software; and wherein routing table updates and update instructions are received by said routing table agent from said telephony routing information protocol software irrespective of the selected acceptable messaging protocol being served by said routing table agent.

11. The signalling switch of claim 10, where the protocol of any message being handled by said signalling switch is chosen from the group consisting of SIP and H.323.

12. The signalling switch of claim 8, wherein said operations and maintenance control card includes node maintenance software resident therein; whereby said application dispatcher software is further adapted to communicate with said node maintenance software so as to provide current device availability information.

13. The signalling switch of claim 1, wherein a plurality of protocol software for a plurality of message protocols is resident on said at least one second non-system card.

14. The signalling switch of claim 1, wherein tuning means are provided so as to distribute messaging loads among said computer bus and said two local buses on said first non-system card.

* * * * *